(12) United States Patent
Mutikainen et al.

(10) Patent No.: US 8,265,615 B2
(45) Date of Patent: Sep. 11, 2012

(54) SYSTEM APPARATUS AND METHOD FOR UPDATING COMMUNICATION SERVICES

(75) Inventors: Jari Mutikainen, Lepsämä (FI); Miikka Poikselkä, Espoo (FI)

(73) Assignee: Nokia Corporation, Espoo (FI)

( * ) Notice: Subject to any disclaimer, the term of this patent is extended or adjusted under 35 U.S.C. 154(b) by 981 days.

(21) Appl. No.: 12/232,798

(22) Filed: Sep. 24, 2008

(65) Prior Publication Data

US 2009/0111449 A1 Apr. 30, 2009

Related U.S. Application Data

(60) Provisional application No. 61/001,114, filed on Oct. 31, 2007.

(51) Int. Cl.
*H04M 3/00* (2006.01)
*H04L 12/66* (2006.01)

(52) U.S. Cl. ......................................... 455/418; 370/352

(58) Field of Classification Search ............... 455/552.1, 455/445, 435.1, 433, 412.2, 436, 453, 420; 370/331, 356, 352, 395.5, 335, 332
See application file for complete search history.

(56) References Cited

U.S. PATENT DOCUMENTS

| | | | |
|---|---|---|---|
| 7,574,207 B1 * | 8/2009 | O'Neil et al. | 455/435.1 |
| 2004/0236932 A1 | 11/2004 | Zhang et al. | |
| 2006/0258394 A1 * | 11/2006 | Dhillon et al. | 455/552.1 |
| 2006/0286984 A1 * | 12/2006 | Bonner | 455/445 |

OTHER PUBLICATIONS

"3G TS 24.173 V7.0.0, 3rd Generation Partnership Project; Technical Specification Group Core Network and Terminals; IMS Multimedia Telephony Communication Service and Supplementary Services; Stage 3 (Release 7)," [online]. Retrieved from the Internet: <http://www.3gpp.org/ftp/Specs/archive/24_series/24.173/24173-700.zip>, Mar. 2007, 13 pages.

3GPP TR 23.892; 3rd Generation Partnership Project; Technical Specification Group Services and System Aspects; IP Multimedia System (IMS) Centralized Services (Release 8); Mar. 2008; pp. 1-168; v2.0.0.

3GPP TR 23.892; 3rd Generation Partnership Project; Technical Specification Group Services and System Aspects; IP Multimedia System (IMS) Centralized Services (Release 8); Oct. 2007; pp. 1-142; v1.3.0.

International Search Report, PCT/IB2008/00276 dated Mar. 27, 2009.

* cited by examiner

*Primary Examiner* — Kiet Doan
(74) *Attorney, Agent, or Firm* — Alston & Bird LLP

(57) ABSTRACT

A system for updating communication services includes user equipment configured to communicate using a first communication service standard and a second communication service standard, a subscriber database, an application server, and a network device. The network device detects an update trigger corresponding to a user equipment, requests that the user equipment discontinue using the first communication service standard, and flags the user equipment as updated by communicating with the application server and the subscriber database. The network device also receives a communication from the user equipment and determines whether the communication corresponds to the first communication service standard or the second communication service standard. If the communication corresponds to the first communication service standard the network device communicates an error message to the user equipment. However, if the communication corresponds to a second communication service standard, the network device processes the communication.

12 Claims, 6 Drawing Sheets

SYSTEM APPARATUS AND METHOD FOR UPDATING COMMUNICATION SERVICES

CROSS-REFERENCE TO RELATED APPLICATIONS

This application claims priority of U.S. Provisional Patent Application No. 61/001,114, filed on Oct. 31, 2007. The subject matter of this earlier application is hereby incorporated by reference.

BACKGROUND OF THE INVENTION

1. Field of the Invention

The present invention is directed, in part, to methods and systems for enabling a service upgrade from one communication service standard to another communication service standard.

2. Description of the Related Art

Communication networks are evolving from circuit switched (CS) infrastructures towards packet switched (PS) infrastructures. A single common consolidated core network offers service providers the possibility of reducing core network complexity and maintenance. As service providers shift their core network infrastructure from the CS domain to a consolidated common internet protocol multimedia system (IMS) infrastructure, there is a need to enable the consistent provision of services to subscribers over a variety of accesses, including CS domain and PS domain accesses.

Initially, it can be expected that the coverage of internet protocol connectivity access networks (IP-CAN) capable of transporting bi-directional speech media will be limited compared to CS domain access networks at least during the introduction period of IP-CANs capable of transporting bi-directional speech media. The Third Generation Partnership Project (3GPP) standardization body is defining architecture to enable the use of a CS bearer for speech media while the service execution is moved to the IMS system. Therefore, a need exists to specify an architecture that supports the provision of IMS based services across a variety of PS domain or CS domain access networks. This would enable a consistent user-experience with bi-directional speech services of IMS subscribers irrespective of being inside or outside the coverage of an IP-CAN capable of transporting bi-directional speech media.

Additionally, global system for mobile communications (GSM) supplementary services have been well defined in the past. IMS supplementary services were specified in 3GPP Release 7 as part of multimedia telephony service (MMTel, 3GPP TS 24.173). GSM and IMS service sets are generally incompatible. For example, MMTel services in IMS domains contain far more granular service conditions when certain supplementary services are executed. Such services are generally impossible to provide in a GSM domain.

This deficiency leads to problems where a single user is using both CS and IMS domains, as it is not easy or possible to convert the data model from one domain to the other. For example, in an IMS domain, a user can set call forwarding services to a session initiation protocol (SIP) uniform resource identifier (URI) type of address (mysecretery@example.com) and if the user attempts to query call forwarding setting via CS it is impossible to present this information, since the GSM data model is only able to present E.164 numbers as a call forwarding destination.

Also, operators need to be able to deploy an IMS system that serves both subscribers using MMTel capable IMS user equipment (UE) and subscribers that use legacy (non-MMTel capable) GSM UEs that are connected to the IMS domain via network adaptor or gateway (L-CAAF-n or ICCF). The problem is how to ensure that one common IMS system is able to service subscribers in both service models (GSM and MMTel) and still ensure service consistency for each individual subscriber, i.e. ensure that the MMtel and GSM services are not mixed for a particular subscriber.

SUMMARY OF THE INVENTION

The present invention has been developed in response to the present state of the art, and in particular, in response to the problems and needs in the art that have not yet been fully solved by currently available communication system technologies.

In one embodiment of the present invention, an apparatus comprises a detector configured to detect an update trigger corresponding to a user equipment configured to communicate using a first communication service standard and a second communication service standard, a requesting unit configured to request that the user equipment discontinue using the first communication service standard, and a flagging unit configured to flag the user equipment as updated.

In certain embodiments, the apparatus further comprises a receiver configured to receive a communication from the user equipment, a determining unit configured to determine whether the communication corresponds to the first communication service standard or the second communication service standard, and a communicating unit configured to communicate an error message to the user equipment when the communication corresponds to the first communication service standard. In some embodiments, the apparatus further comprises a processor configured to process the communication when the communication corresponds to a second communication service standard.

In certain embodiments, the apparatus also includes an update unit configured to provide update data to the user equipment to facilitate the use of the second communication service standard instead of the first communication service standard. The update trigger may include the user equipment operating in a manner inconsistent with the first communication service standard. In some embodiments, the flagging unit is configured to update a subscriber database with flagging data and communicate with an application server to facilitate flagging of the user equipment as updated. In certain embodiments, the first communication service standard comprises a global system for mobile communication service standard and the second communication service standard comprises an internet protocol multimedia system service standard.

In another embodiment of the present invention, an apparatus comprises a means for detecting an update trigger corresponding to a user equipment configured to communicate using a first communication service standard and a second communication service standard, a means for requesting that the user equipment discontinue using the first communication service standard, and a means for flagging the user equipment as updated.

In another embodiment of the present invention, a method includes detecting an update trigger corresponding to a user equipment configured to communicate using a first communication service standard and a second communication service standard, requesting that the user equipment discontinue using the first communication service standard, and flagging the user equipment as updated.

In certain embodiments, the method also includes receiving a communication from the user equipment, determining whether the communication corresponds to the first communication service standard or the second communication service standard, and communicating an error message to the user equipment when the communication corresponds to the first communication service standard. In some embodiments, the method also includes processing the communication when the communication corresponds to a second communication service standard.

In some embodiments, the method also includes providing update data to the user equipment to facilitate the use of the second communication service standard instead of the first communication service standard. The update trigger may be the user equipment operating in a manner inconsistent with the first communication service standard. In certain embodiments, the method also includes updating a subscriber database with flagging data and communicating with an application server to facilitate the flagging of the user equipment as updated. The first communication service standard may be a global system for mobile communication service standard and the second communication service standard may be an internet protocol multimedia system service standard.

In another embodiment of the present invention, a computer program is embodied on a computer readable medium. The computer program may be configured to control a processor to perform operations that include detecting an update trigger corresponding to a user equipment configured to communicate using a first communication service standard and a second communication service standard, requesting that the user equipment discontinue using the first communication service standard, and flagging the user equipment as updated.

In another embodiment of the present invention, an apparatus includes a storage unit configured to store an update status corresponding to a user equipment, a communication unit configured to receive a user equipment updated message corresponding to the user equipment, and an update unit configured to change the update status corresponding to the user equipment in accordance with the user equipment updated message, where the update status corresponds to a first communication standard and a second communication standard used by the user equipment. In certain embodiments, the communication unit is further configured to communicate the update status corresponding to the user device in response to a request for the update status of the user device.

In another embodiment of the present invention, an apparatus includes a means for storing an update status corresponding to a user device, a means for receiving a user equipment updated message corresponding to the user equipment, and a means for changing the update status corresponding to the user equipment in accordance with the user equipment updated message, where the update status corresponds to a first communication standard and a second communication standard used by the user equipment.

In another embodiment of the present invention, a method includes storing an update status corresponding to a user device, receiving a user equipment updated message corresponding to the user equipment, and changing the update status corresponding to the user equipment in accordance with the user equipment updated message, where the update status corresponds to a first communication standard and a second communication standard used by the user equipment. The method may also include communicating the update status corresponding to the user device in response to a request for the update status of the user device.

In another embodiment of the present invention, a computer program is embodied on a computer readable medium. The computer program may be configured to control a processor to perform operations that include storing an update status corresponding to a user device, receiving a user equipment updated message corresponding to the user equipment, and changing the update status corresponding to the user equipment in accordance with the user equipment updated message, where the update status corresponds to a first communication standard and a second communication standard used by the user equipment.

In another embodiment of the present invention, an apparatus includes a receiver configured to receive a communication corresponding to a user equipment and a first communication service standard, a querying unit configured to query a subscriber database to determine whether the user equipment has been updated in accordance with a second communication service standard, and a transmitter configured to send an error message to a network device when the user equipment has been updated according to the second communication service standard. In certain embodiments, the first communication service standard comprises a global system for mobile communication service standard and the second communication service standard comprises an internet protocol multimedia system service standard.

In another embodiment of the present invention, an apparatus includes a means for receiving a communication corresponding to a user equipment and a first communication service standard, a means for querying a subscriber database to determine whether the user equipment has been updated in accordance with a second communication service standard, and a means for sending an error message to a network device when the user equipment has been updated according to the second communication service standard.

In another embodiment of the present invention, a method includes receiving a communication corresponding to a user equipment and a first communication service standard, querying a subscriber database to determine whether the user equipment has been updated in accordance with a second communication service standard, and sending an error message to a network device when the user equipment has been updated according to the second communication service standard. In certain embodiments, the first communication service standard comprises a global system for mobile communication service standard and the second communication service standard comprises an internet protocol multimedia system service standard.

In another embodiment of the present invention, a computer program is embodied on a computer readable medium. The computer program may be configured to control a processor to perform operations that include receiving a communication corresponding to a user equipment and a first communication service standard, querying a subscriber database to determine whether the user equipment has been updated in accordance with a second communication service standard, and sending an error message to a network device when the user equipment has been updated according to the second communication service standard.

BRIEF DESCRIPTION OF THE DRAWINGS

For proper understanding of the invention, reference should be made to the accompanying drawings where.

DETAILED DESCRIPTION OF PREFERRED EMBODIMENTS

Figure 1:
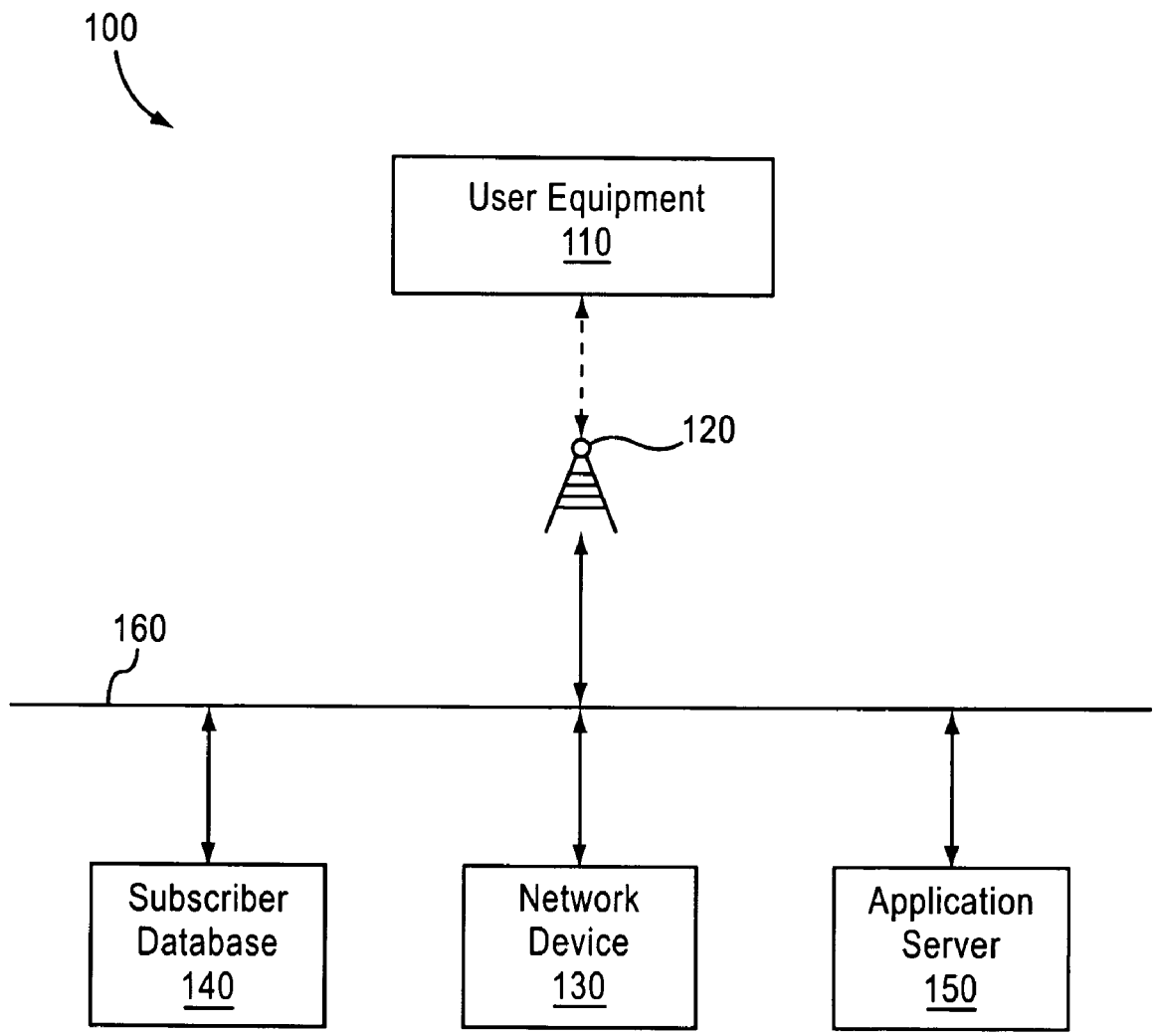
FIG. 1 is a block diagram of one embodiment of a communication services upgrade system in accordance with the present invention.

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in the attached figures, is not intended to limit the scope of the invention, as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

In addition, while the terms, data, packet, and/or datagram have been used in the description of the present invention, the invention has import to many types of network data. For purposes of this invention, the term data includes packet, cell, frame, datagram, bridge protocol data unit packet, packet data and any equivalents thereof.

A network device for updating communication services. The network device includes a detector configured to detect an update trigger corresponding to a user equipment configured to communicate using a first communication service standard and a second communication service standard. The network device also includes a requesting unit configured to request that the user equipment discontinue using the first communication service standard and a flagging unit configured to flag the user equipment as updated. The network device further includes a receiver configured to receive a communication from the user equipment and a determining unit configured to determine whether the communication corresponds to the first communication service standard or the second communication service standard. Additionally, the network device includes a communicating unit configured to communicate an error message to the user equipment if the communication corresponds to the first communication service standard and a processor configured to process the communication if the communication corresponds to a second communication service standard.

Certain embodiments of the present invention provide a system and method to enable an upgrade from GSM service subscription to Internet Protocol Multimedia System (IMS) service subscription and system and method to detect and act on error cases. This upgrade can be performed once for each subscriber or user equipment in one operation or in multiple stages.

In certain embodiments, a global system for mobile communications (GSM) service operations are disabled in response to a trigger to convert to multimedia telephony (MMTel) services is detected. The trigger may be, for example, that the user equipment is using MMtel services. This change allows the user to continue to use the GSM device with the GSM services disabled. The user may use the MMTel user equipment to continue to use the GSM device with the GSM services disabled, or the network/operator may provide, for example, a web page or java application to the GSM user equipment that the user can use to manipulate the services from the GSM user equipment.

FIG. 1 is a block diagram of one embodiment of a communication services upgrade system 100 in accordance with the present invention. The depicted system 100 includes user equipment 110, a base station 120, a network device 130, a subscriber database 140, an application server 150, and a network backbone 160. A user equipment 110 can include, for example, a cellular telephone, a personal data assistant, a personal computer, or any other communication device or appliance. A network device 130, subscriber database 140, and the application server 150 can include, for example, one or more general purpose computers or an application specific integrated circuit (ASIC). The components of the system 100 can cooperate to upgrade communication services.

In certain embodiments, the user equipment 110 can communicate with the network device 130 via the base station 120 and network backbone 160, using a first communication service standard and/or a second communication service standard. In certain embodiments the network device 130 detects a user equipment trigger which may include the user equipment 110 communicating using the second communication service standard. In some embodiments, the network device 130 flags the user equipment 110 as updated by communicating with the subscriber database 140. The network device 130 may also communicate a request to the user equipment 110 requesting the user equipment to no longer communicate using the first communication service standard.

In some embodiments, the user equipment 110 communicates with the network device 130 using the first communication service standard. In certain embodiments, the network device 130 communicates with the subscriber database 140 to determine whether the user equipment has been flagged as updated. In other embodiments, the application server 150 queries the subscriber database 140 to determine whether the user equipment 110 has been flagged as updated. The application server 150 may return the result of the query to the network device 130.

In some embodiments, if the user equipment 110 has not been flagged, the network device 130 processes the communication. However, in certain embodiments, if the user equipment 110 has been flagged, the network device 130 may communicate an error to the user equipment 110, indicating that the user equipment 110 does not have permission to communicate using the first communication service standard, but should communicate using the second communication service standard. Accordingly, the components of the system 100 enable the upgrading of communication services.

Figure 2:
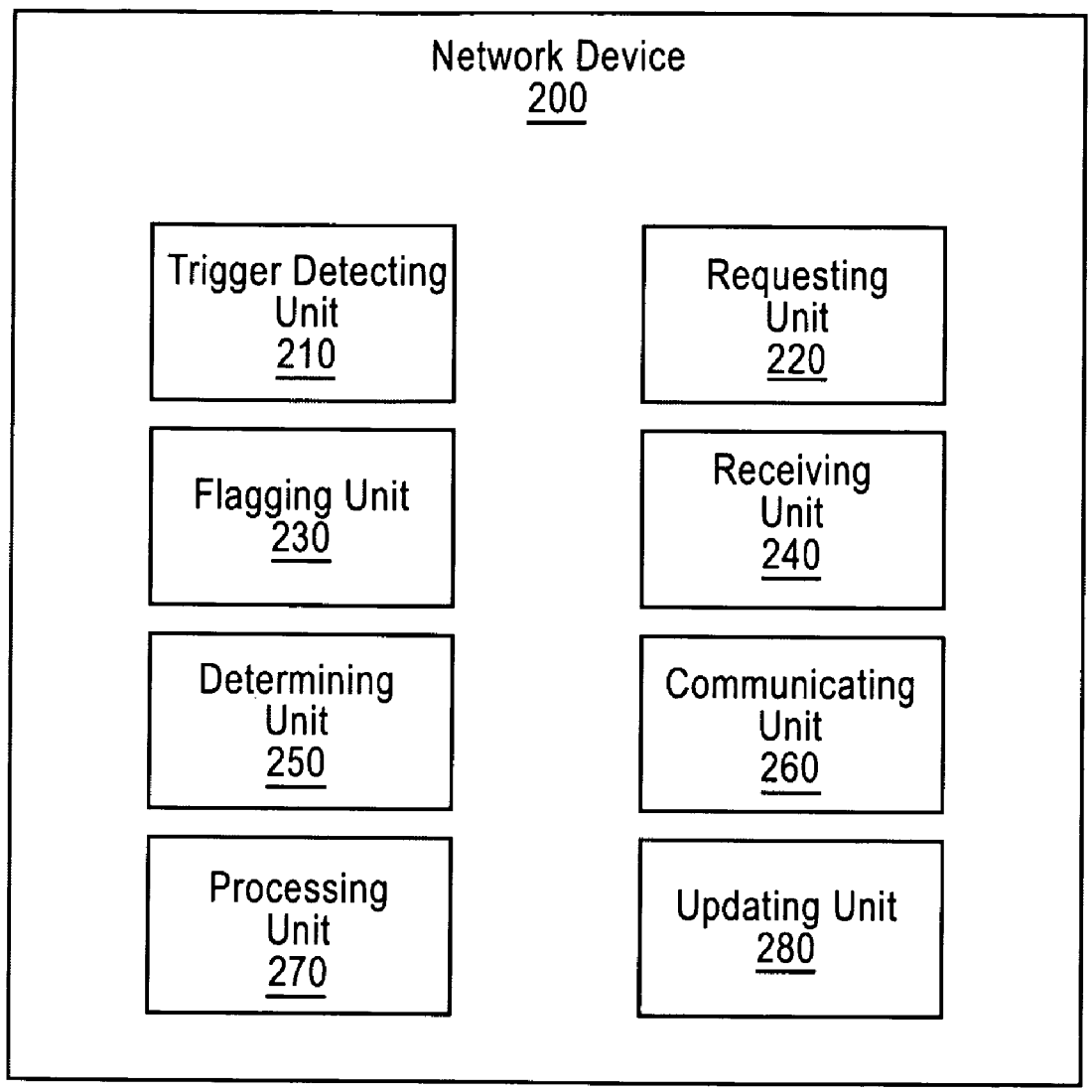
FIG. 2 is a block diagram of one embodiment of a communication services upgrade apparatus in accordance with the present invention.

FIG. 2 is a block diagram of one embodiment of a communication network device 200 in accordance with the present invention. The depicted network device 200 includes a trigger detecting unit, or detector, 210, a requesting unit 220, a flagging unit 230, a receiving unit, or receiver, 240, a determining unit 250, a communicating unit 260, a processing unit, or processor, 270, and an updating unit 280. The units of the network device 200 can cooperate to update communication services. It should be noted that the units depicted in FIG. 2, in some embodiments, could be distributed amongst multiple network devices instead of a single network device.

In certain embodiments, the trigger detecting unit 210 detects an update trigger corresponding to user equipment configured to communicate using a first communication service standard and a second communication service standard. In some embodiments, the requesting unit 220 requests that the user equipment discontinue using the first communication service standard. In some embodiments, the flagging unit 230 flags the user equipment as updated. In certain embodiments, the updating unit 280 provides update data to the user equipment to facilitate the use of the second communication service standard instead of the first communication service standard.

In certain embodiments, the receiving unit 240 receives a communication from the user equipment. In some embodiments, the determining unit 250 determines whether the communication corresponds to the first communication service standard or the second communication service standard. In certain embodiments, the communicating unit 260 communicates an error message to the user equipment if the communication corresponds to the first communication service standard. In some embodiments, the processing unit 270 processes the communication if the communication corresponds to a second communication service standard. In this manner, the apparatus 200 enables communication service standard updating.

In certain embodiments, the user equipment may be a GSM subscriber. In such an embodiment, in the initial state, the GSM subscriber shifts to an IMS system, but is still using traditional GSM user equipment, and thus, the IMS provides GSM-like services for this subscriber. Once the subscriber starts using multimedia telephony (MMTel) services (e.g., takes the MMTel user equipment into use) the following actions may be taken, depending upon the embodiment. Once the network gets a trigger that a particular user is starting to use IMS centralized service (e.g. MMTel services) the network may perform operations of disabling the GSM service setting operations from the GSM user equipment, providing a notification or new application to the GSM user equipment, and enabling a mechanism to detect and react to a misbehaving device.

The trigger for the above action is generally a request for services outside of GSM and could include a MMTel user equipment creating service settings (e.g. an eXtensible Markup Language (XML) document) that include elements that are not associated with GSM service. The service document may be created under the same subscription that services the GSM user equipment. The trigger could also include a MMTel user equipment being used under the same subscription that serves a GSM user equipment.

In certain embodiments, a mechanism to disable GSM service settings could be achieved, e.g., by using a customized application of mobile network enhanced logic (CAMEL) service that blocks GSM service setting commands used for supplementary services or disabling the corresponding services in a home location register or visitor location register (HLR/VLR). This can help to ensure that the GSM user equipment cannot use an integrated user interface to manipulate the GSM supplementary service settings. After this point, the user can manipulate the MMTel service settings only.

In certain embodiments, the network may store a "MMTel supplementary services execution activated" flag as part of a subscriber's profile. This flag may be useful for the operator in order to more easily determine that a certain subscriber has been upgraded to use a MMTel service model instead of a GSM service model. In some embodiments, the network may then use this flag to block supplementary GSM service commands via traditional circuit switched (CS) networks to ensure a coherent end-user experience.

In embodiments of the present invention, mechanisms exist to enforce this type of behavior. For example, in some embodiments, this maybe enforced at a local CS access adaptation function network (L-CAAF-n) equivalent as defined in 3GPP TR 23.982 or similar function providing adaptation from CS/GSM supplementary control operations to the extensible markup language (XML) configuration access protocol (XCAP/Ut) signaling (IMS). In certain embodiments, this requirement maybe enforced at the application providing the IMS (MMTel) services, e.g., telephony application server (TAS).

In some embodiments, this condition maybe enforced by a L-CAAF using the same mechanism to block the GSM service commands as used by a visited mobile switching center (VMSC)/visitor location register (VLR)/home location register (HLR); however, in this case, the L-CAAF-n does not need to read the new flag from the subscriber profile. Whether this alternative is possible may depend on the L-CAAF-n implementation and what is the execution order of the L-CAAF-n specific procedures and the VMSC specific procedures when the L-CAAF-n receives the GSM supplementary service commands.

In some embodiments, the operation of storing the flag better ensures that if the GSM user equipment (UE) did not receive the service settings application and the end user continues to use the integrated GSM service settings user interface (UI) in the GSM user equipment, the system does not override or damage any MMTel service settings the subscriber creates via the MMTel user equipment. In some embodiments, although, technically, it may present certain MMTel setting documents via GSM settings (i.e., documents that do not contain elements that have not been defined in GSM), in sake of coherent end user experience, the end user uses the services settings of Midlet or other mechanisms and disables the GSM settings once the upgrade to MMTel services is complete.

It should be noted that many of the functional units described in this specification have been presented as units in order to more particularly emphasize their implementation independence. For example, a unit may be implemented as a hardware circuit comprising custom VLSI circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be partially implemented in software for execution by various types of processors. An identified unit of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit.

Indeed, a unit of executable code could be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
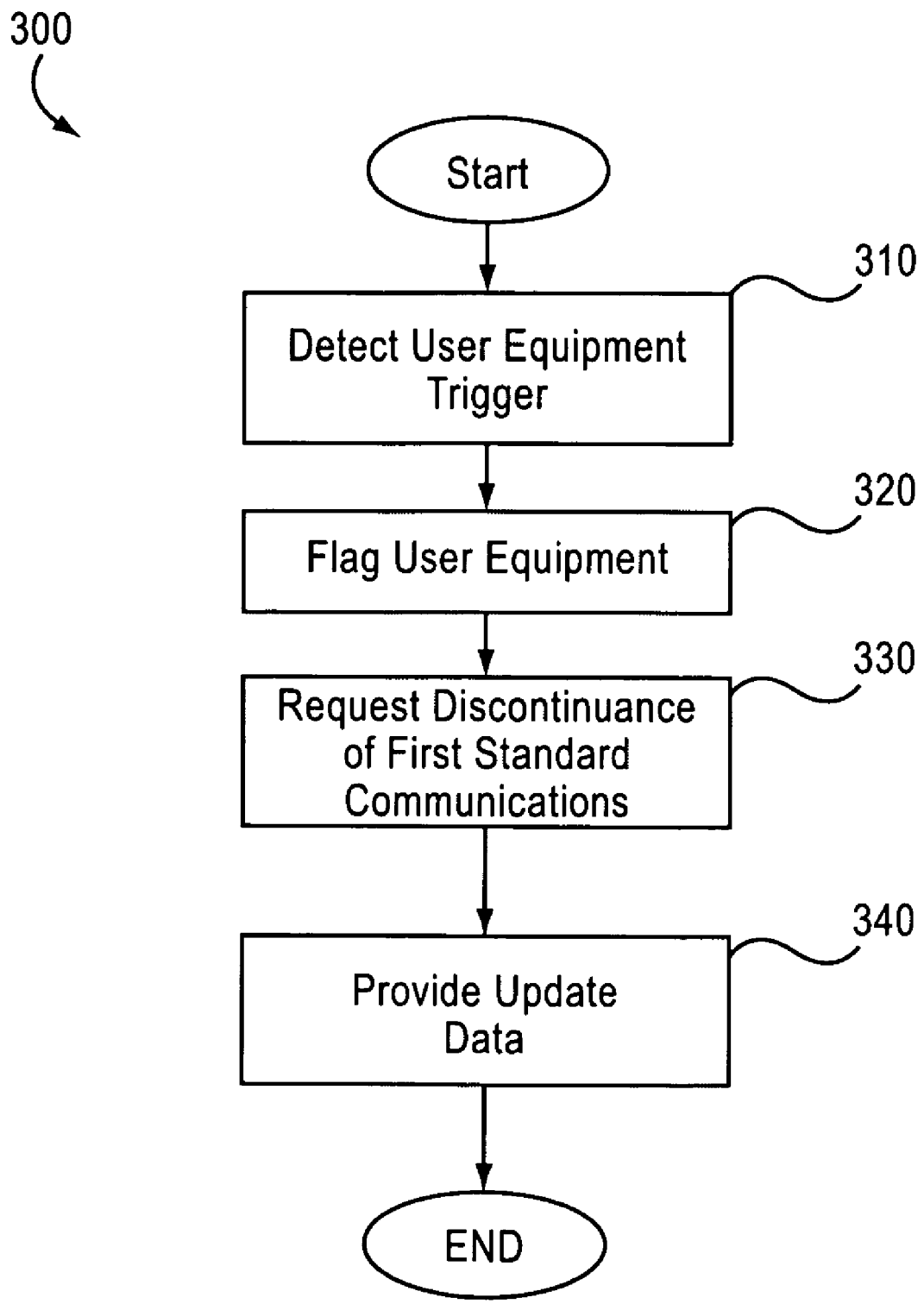
FIG. 3 is a flow chart diagram of one embodiment of a method for upgrading communication services in accordance with the present invention.

FIG. 3 is a flow chart diagram of one embodiment of a method 300 for upgrading communication services in accordance with the present invention. The depicted method 300 includes detecting 310 a user equipment trigger, flagging 320 the user equipment, and requesting 330 discontinuance of communications corresponding to a first communication service standard, providing 340 update data. The operations of the method 300 can cooperate to update communication service standards.

Detecting 310 may include detecting an update trigger corresponding to a user equipment configured to communicate using a first communication service standard and a second communication service standard. In certain embodiments, detecting 310 a user equipment updated trigger may include detecting that the user equipment is using a second communication services standard as opposed to a first communication services standard. Also, detecting 310 a user equipment updated trigger may include detecting that a user equipment is communicating in a manner inconsistent with a first communication services standard. In some embodiments, detecting 310 a user equipment update trigger may include MMTel user equipment creating service settings that include elements not apart of GSM. Detecting 310 a user equipment update trigger may also include MMTel user equipment taken into use for the first time under the same subscription that services GSM user equipment.

Flagging 320 may include flagging the user equipment capable of communicating using the second communication service standard. In some embodiments, flagging 320 the user equipment may include updating a subscriber database that the user equipment should no longer communicate using the first communication service standard. Depending on the embodiment, a subscriber database may or may not be local.

Requesting 330 may include requesting that the user equipment discontinue using the first communication service standard. Providing 340 may include providing update data to the user equipment to facilitate the use of the second communication service standard instead of the first communication service standard. Update data may include logical instructions, software content, or data for no longer communicating using the first communication service standard.

In some embodiments, the network (service provider/operator/device) could send a message to the user equipment instructing the user equipment to not use traditional GSM supplementary mechanisms (i.e., integrated service settings user interface in the GSM user equipment). At the same time, in some embodiments, a service provider/operator/network device could specify the non-standardized means that are available for service configuration (e.g., call to the operator, web page for self service management, etc.). In certain embodiments, a new service settings application (e.g., Midlet or subscriber identity module (SIM) application toolkit) can be automatically pushed to the GSM device. Additionally, a link to the web or wireless application protocol (WAP) page for service settings could be sent to the GSM device which could be used to manipulate service configurations related to the MMTel supplementary services.

Figure 4:
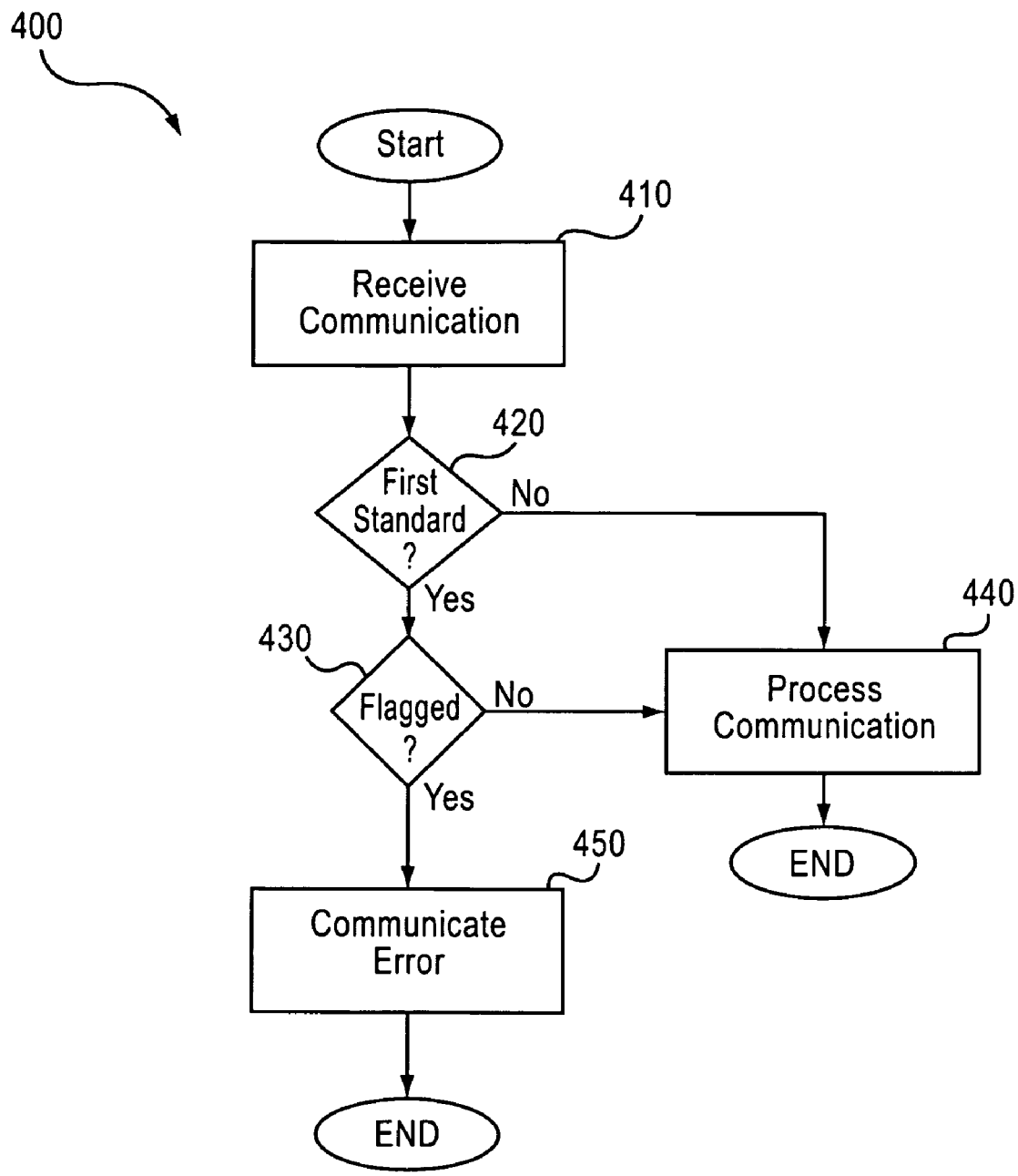
FIG. 4 is a flow chart diagram of one embodiment of a method for upgrading communication services in accordance with the present invention.

FIG. 4 is a flow chart diagram of one embodiment of a method 400 for communication service standards updating in accordance with the present invention. As depicted, the method 400 includes receiving 410 a communication from user equipment, determining 420 whether the communication corresponds to a first communication service standard, determining 430 whether the use equipment is flagged, processing 440 the communication, and communicating 450 an error message to the user equipment. The operations of the method 400 can ensure that updated/flagged user equipment communicates using a second communication service standard instead of a first communication service standard.

Receiving 410 a communication from user equipment may include a network device receiving a communication from user equipment capable of using a first communication service standard and a second communication service standard. In some embodiments, the first communication service standard corresponds to a GSM standard. In certain embodiments, the second communication service standard corresponds to a IMS standard. Once the communication from the user equipment is received, the method 400 continues by determining 420 whether the communication corresponds to a first communication service standard.

If the communication does not, the communication is processed at operation 440. If the communication does correspond to a first communication service standard, then the method 400 continues by determining 430 whether the user equipment is flagged. If the user equipment is not flagged, the communication is processed at operation 440. However, if the user equipment corresponding to the communication is flagged, then the method 400 continues by communicating an error message to the user equipment. Accordingly, the method 400 provides an example of ensuring the user equipment communication service standards are updated. In this manner, operations of the method 400 ensure that updated/flagged user equipment communicates using a second communication service standard instead of a first communication service standard.

Figure 5:
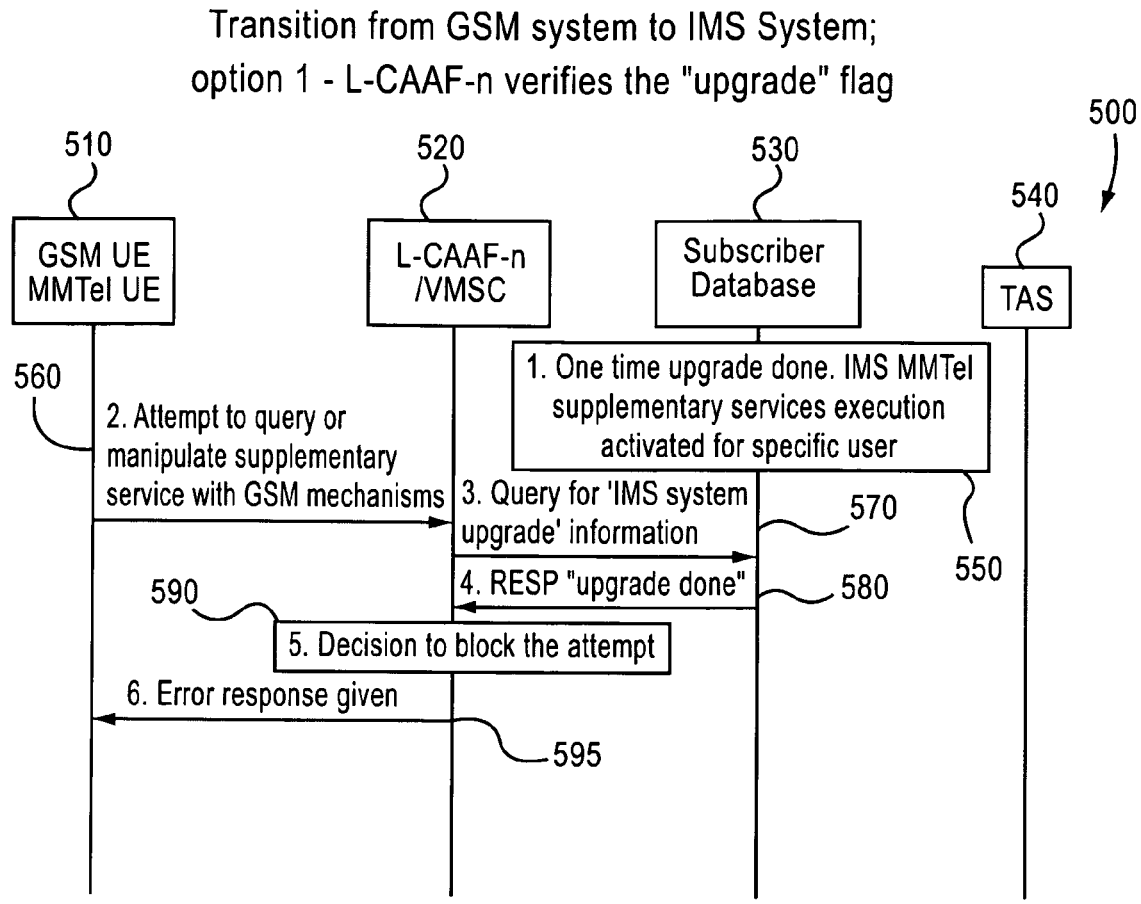
FIG. 5 is a sequence diagram of one embodiment of a process flow for upgrading communication services in accordance with the present invention.

FIG. 5 is a sequence diagram of one embodiment of a process flow 500 for upgrading communication services in accordance with the present invention. The depicted process flow 500 includes GSM/MMTel user equipment 510, a L-CAAF-n/VMSC 520, a subscriber database 530, and a TAS 540. The components of the process flow 500 can cooperate to update the communication service standards of a user equipment and ensure that user equipment communicates using the updated communication service standards.

In process 550, an upgrade is performed. The upgrade may include updating the subscriber database 530 to flag the user equipment 510 as updated to use a second communication service standard (i.e. MMTel) instead of a first communication service standard (i.e. GSM). In process 560, the GSM/MMTel user equipment attempts to query or manipulate supplementary services with GSM mechanisms by communicating with the L-CAAF-n/VMSC 520. In response, the L-CAAF-n/VMSC 520 queries for IMS system upgrade information in process 570. In process 580, the subscriber database responds confirming that the GSM/MMTel user equipment was previously upgraded. Accordingly, the L-CAAF-n/VMSC 520 decides to block the attempt at process 590 and an error message is communicated to the GSM MMTel user equipment in process 595. It should be noted that in the embodiment depicted by FIG. 5, no communications or processes corresponding to the TAS 540 are necessary. In some embodiments, if the GSM/MMTel user equipment was not previously upgraded, the attempt of process 560 would be duly processed.

Figure 6:
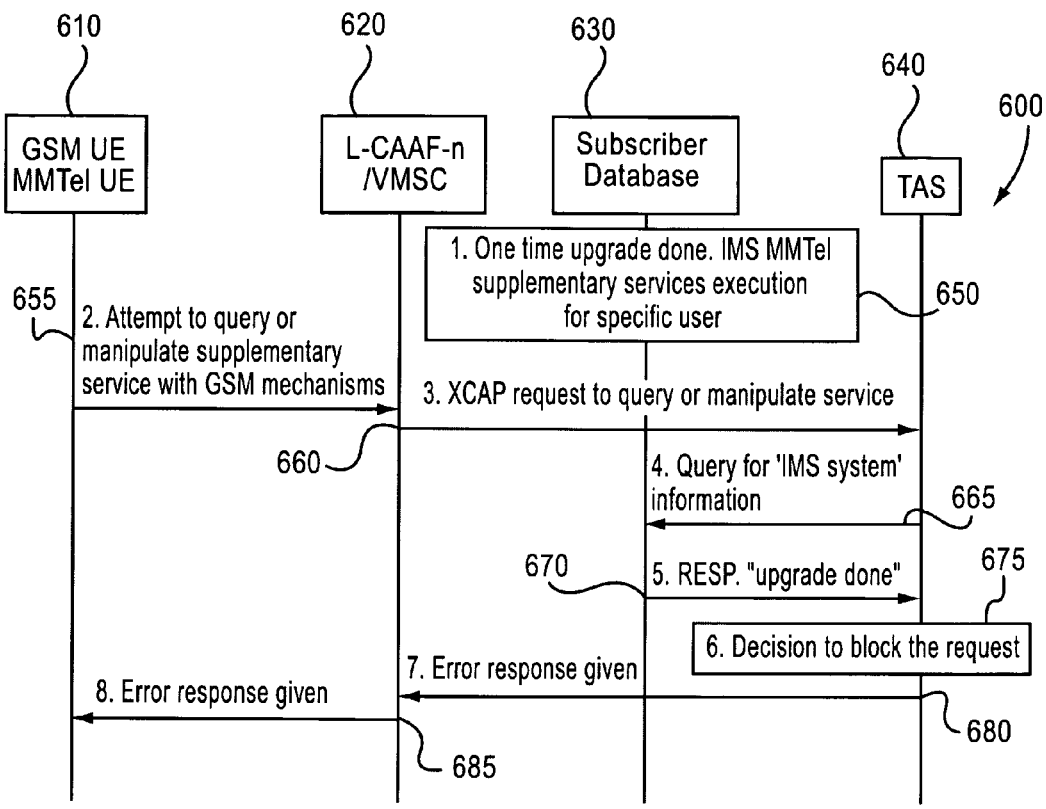
FIG. 6 is a sequence diagram of one embodiment of a process flow for upgrading communication services in accordance with the present invention.

FIG. 6 is a sequence diagram of one embodiment of a process flow 600 for upgrading communication services in accordance with the present invention. The depicted process flow 600 includes a GSM/MMTel user equipment 610, an L-CAAF-n/VMSC 620, a subscriber database 630, and a TAS 640. The components of the process flow 600 can cooperate to ensure that user equipment communicates using the updated communication service standards.

In process 650, an upgrade of the GSM/MMTel user equipment is performed. This upgrade may include flagging the GSM/MMTel as upgraded to a second communication service standard such as MMTel as opposed to GSM. In process 655, the GSM/MMTel user equipment 620 can attempt to query or manipulate supplementary service with GSM mechanisms. The L-CAAF-n/VMSC, in process 660, communicates an XCAP request to query or manipulate service to the TAS 640.

In process 665, the TAS queries the subscriber database 630 for IMS system information corresponding to the GSM/MMTel user equipment 620. In process 670, the subscriber database 630 returns an "upgrade done" message back to the TAS 640. The TAS 640 then decides to block the request in process 675 and sends an error message to the L-CAAF-n/VMSC in process 680. In process 685, the L-CAAF-n/VMSC communicates the error message to the GSM/MMTel user equipment 610. In some embodiments, if the GSM/MMTel user equipment was not previously upgraded, the attempt of process 655 would be duly processed. Accordingly, the process flow 600 provides one of many solutions in accordance with the present invention for updating communication service standards and ensuring that user equipment communicates according to the upgrade.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

A computer readable medium disclosed herein may include a variety of memory mediums including, for example, all forms of volatile memory or nonvolatile memory. Additionally, certain descriptions herein are directed toward GSM and IMS standards; however, the subject matter disclosed herein is in no way intended to be applied solely to GSM and IMS standards, but could be applied to a variety of different standards.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

We claim:

1. An apparatus comprising:
at least a processor and a memory having computer coded instructions therein, said instructions being configured to, when executed by the processor, cause the apparatus to:
detect an update trigger corresponding to a user equipment configured to communicate using a first communication service standard and a second communication service standard;
request that the user equipment discontinue using the first communication service standard;
flag the user equipment as updated;
receive a communication from the user equipment;
determine whether the communication corresponds to the first communication service standard or the second communication service standard; and
communicate an error message to the user equipment when the communication corresponds to the first communication service standard;
wherein said instructions are further configured to, when executed by the processor, cause the apparatus to:
determine that the update trigger indicates that the user equipment is operating in a manner inconsistent with the first communication service standard; and
wherein: the first communication service standard comprises a global system for mobile communication service standard and the second communication service standard comprises an internet protocol multimedia system service standard.

2. The apparatus of claim 1, wherein said instructions are further configured to, when executed by the processor, cause the apparatus to:
process the communication when the communication corresponds to a second communication service standard.

3. The apparatus of claim 1, wherein said instructions are further configured to, when executed by the processor, cause the apparatus to:
provide update data to the user equipment to facilitate the use of the second communication service standard instead of the first communication service standard.

4. The apparatus of claim 1, wherein said instructions are further configured to, when executed by the processor, cause the apparatus to:
update a subscriber database with flagging data.

5. The apparatus of claim 1, wherein said instructions are further configured to, when executed by the processor, cause the apparatus to:
communicate with an application server to facilitate flagging of the user equipment as updated.

6. An apparatus, comprising:
means for detecting an update trigger corresponding to a user equipment configured to communicate using a first communication service standard and a second communication service standard;
means for requesting that the user equipment discontinue using the first communication service standard;
means for flagging the user equipment as updated;
means for receiving a communication from the user equipment;
means for determining whether the communication corresponds to the first communication service standard or the second communication service standard; and
means for communicating an error message to the user equipment when the communication corresponds to the first communication service standard;

means for determining that the update trigger indicates that the user equipment is operating in a manner inconsistent with the first communication service standard; and wherein the first communication service standard comprises a global system for mobile communication service standard and the second communication service standard comprises an internet protocol multimedia system service standard.

7. The method comprising:

detecting an update trigger corresponding to a user equipment configured to communicate using a first communication service standard and a second communication service standard;

requesting that the user equipment discontinue using the first communication service standard;

flagging the user equipment as updated;

receiving a communication from the user equipment;

determining whether the communication corresponds to the first communication service standard or the second communication service standard; and communicating an error message to the user equipment when the communication corresponds to the first communication service standard;

wherein the update trigger comprises the user equipment operating in a manner inconsistent with the first communication service standard; and wherein the first communication service standard comprises a global system for mobile communication service standard and the second communication service standard comprises an internet protocol multimedia system service standard.

8. The method of claim 7, further comprising:
processing the communication when the communication corresponds to a second communication service standard.

9. The method of claim 7, further comprising:
providing update data to the user equipment to facilitate the use of the second communication service standard instead of the first communication service standard.

10. The method of claim 7, further comprising:
updating a subscriber database with flagging data.

11. The method of claim 7, further comprising:
communicating with an application server to facilitate the flagging of the user equipment as updated.

12. A computer program product comprising computer coded instructions embodied on a non-transitory computer readable medium, the computer coded instructions configured to control cause a processor to perform operations comprising:

detecting an update trigger corresponding to a user equipment configured to communicate using a first communication service standard and a second communication service standard;

requesting that the user equipment discontinue using the first communication service standard;

flagging the user equipment as updated;

receiving a communication from the user equipment;

determining whether the communication corresponds to the first communication service standard or the second communication service standard; and communicating an error message to the user equipment when the communication corresponds to the first communication service standard;

wherein the update trigger comprises the user equipment operating in a manner inconsistent with the first communication service standard; and wherein the first communication service standard comprises a global system for mobile communication service standard and the second communication service standard comprises an internet protocol multimedia system service standard.

* * * * *

UNITED STATES PATENT AND TRADEMARK OFFICE
CERTIFICATE OF CORRECTION

PATENT NO. : 8,265,615 B2
APPLICATION NO. : 12/232798
DATED : September 11, 2012
INVENTOR(S) : Mutikainen et al.

It is certified that error appears in the above-identified patent and that said Letters Patent is hereby corrected as shown below:

Column 14,
Line 12 and 13, "configured to control cause a processor" should read --configured to cause a processor--.

Signed and Sealed this
Twenty-third Day of April, 2013

Teresa Stanek Rea
*Acting Director of the United States Patent and Trademark Office*